United States Patent
Doverspike

[19]

[11] Patent Number: 6,097,696
[45] Date of Patent: Aug. 1, 2000

[54] OPTICAL LAYER QUASI-CENTRALIZED RESTORATION

[75] Inventor: Robert Duncan Doverspike, Tinton Falls, N.J.

[73] Assignee: AT&T Corp., New York, N.Y.

[21] Appl. No.: 09/255,985

[22] Filed: Feb. 23, 1999

Related U.S. Application Data

[60] Provisional application No. 60/075,825, Feb. 24, 1998.

[51] Int. Cl.[7] .......................... G01R 31/08; H01H 37/54
[52] U.S. Cl. .......................... 370/216; 370/238; 370/224; 370/907; 370/255; 359/110
[58] Field of Search .................................. 370/238, 254, 370/221, 224, 225, 228, 907, 255, 222, 223; 340/827, 825.01; 359/110

[56] References Cited

U.S. PATENT DOCUMENTS

5,295,139  3/1994  Plamer ........................................ 370/60
5,608,720  3/1997  Biegel et al. ............................ 370/249

Primary Examiner—Douglas W. Olms
Assistant Examiner—Ali A Zamani

[57] ABSTRACT

A wavelength-switching, mesh-based restoration method among a network of optical cross-connects (OXCs) is disclosed. The method is defined as "quasi-centralized" in that the network is first partitioned into a plurality of subnetworks, then a single "restoration controller" is defined for each separate subnetwork. The subnetwork partitioning is defined as being either "minimally overlapping", meaning that the OXCs are "clustered" in their network topology, with only a few links required to join the various, autonomous subnetworks, or "highly overlapping", meaning that the OXCs are defined as being included in more than one subnetwork. Each subnetwork restoration controller (SRC) includes a network graph and is therefore responsible for providing restoration around faults recognized in its own subnetwork.

16 Claims, 3 Drawing Sheets

□ = SUBNETWORK CONTROLLER
● = OPTICAL CROSS-CONNECT

*FIG. 4*

OPTICAL LAYER QUASI-CENTRALIZED RESTORATION

CROSS-REFERENCE TO RELATED APPLICATION

This application claims priority of Provisional Application Ser. No. 60/075,825, filed Feb. 24, 1998.

BACKGROUND OF THE INVENTION

The present invention relates to a restoration architecture for the "optical technology layer" of a communication network and, more particularly, to an implementation of a pre-defined subnetwork architecture (thus, a "quasi-centralized" approach) and a methodology for providing data path reconfiguration upon failure of a node or link.

There exists at this time several different restoration methods that may be useful with the "optical technology layer" of a communication network. In general, these approaches may be characterized by their various levels of restoration granularity (e.g., line vs. wavelength (channel/path) switching), different topological routing methods (i.e., ring vs. mesh), different classes of replacement paths (point-to-point or local) and different c ontrol schemes (distributed, centralized).

SUMMARY OF THE INVENTION

The present invention is related to a quasi-centralized restoration scheme that utilizes advantages from both the "distributed" and "centralized" approaches. In particular, the present invention is related to an implementation of a pre-defined subnetwork architecture (thus, a "quasi-centralized" approach) and a methodology for providing data path reconfiguration upon failure of a node or link.

In accordance with the present invention, a communication network is first partitioned into either a set of "minimally overlapping" subnetworks, or a set of "highly overlapping" subnetworks, each subnetwork comprising a plurality of optical cross-connect (OXC) nodes. The basis for determining whether to use the "minimal" or "highly overlapping" model is a function of the interconnectivity of the various nodes within the network. Each subnetwork is configured to include a "subnetwork restoration controller" (SRC), where the SRC is defined as including a subnetwork graph defining the interconnection between the OXCs, as well as all necessary rerouting algorithms. As will be discussed in detail below, each SRC is physically linked to only one OXC node in the subnetwork.

Upon the recognition of a failed OXC or link, a "fault notification" message is transmitted back to the appropriate SRC, where the SRC functions to set up an alternate path around the failed node or link. This alternate path may then be taken down once a physical repair to the failure is completed. In accordance with the present invention, two different message models may be used. A first method, defined as "flooding", uses the messaging-initiating OXC to "flood" each OXC to which it is connected (as well as each SRC to which it is connected) with the fault notification message, where the flooding process is continued from OXC to OXC until the proper SRC is notified. For the "highly overlapping" subnetwork model, the flooding method is not preferred, due to the significant interconnectivity of the nodes. An alternative method, suitable for both the "minimally overlapped" and "highly overlapped" subnetwork arrangements, is the "1+1" message routing model, where a "fault notification" message is transmitted over one primary path and one secondary path.

Using either messaging method, the SRC responsible for the identified node/link is ultimately contacted and then ascertains a rerouting path that avoids the failed condition and restores communication within the network.

Various other features of the restoration architecture of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
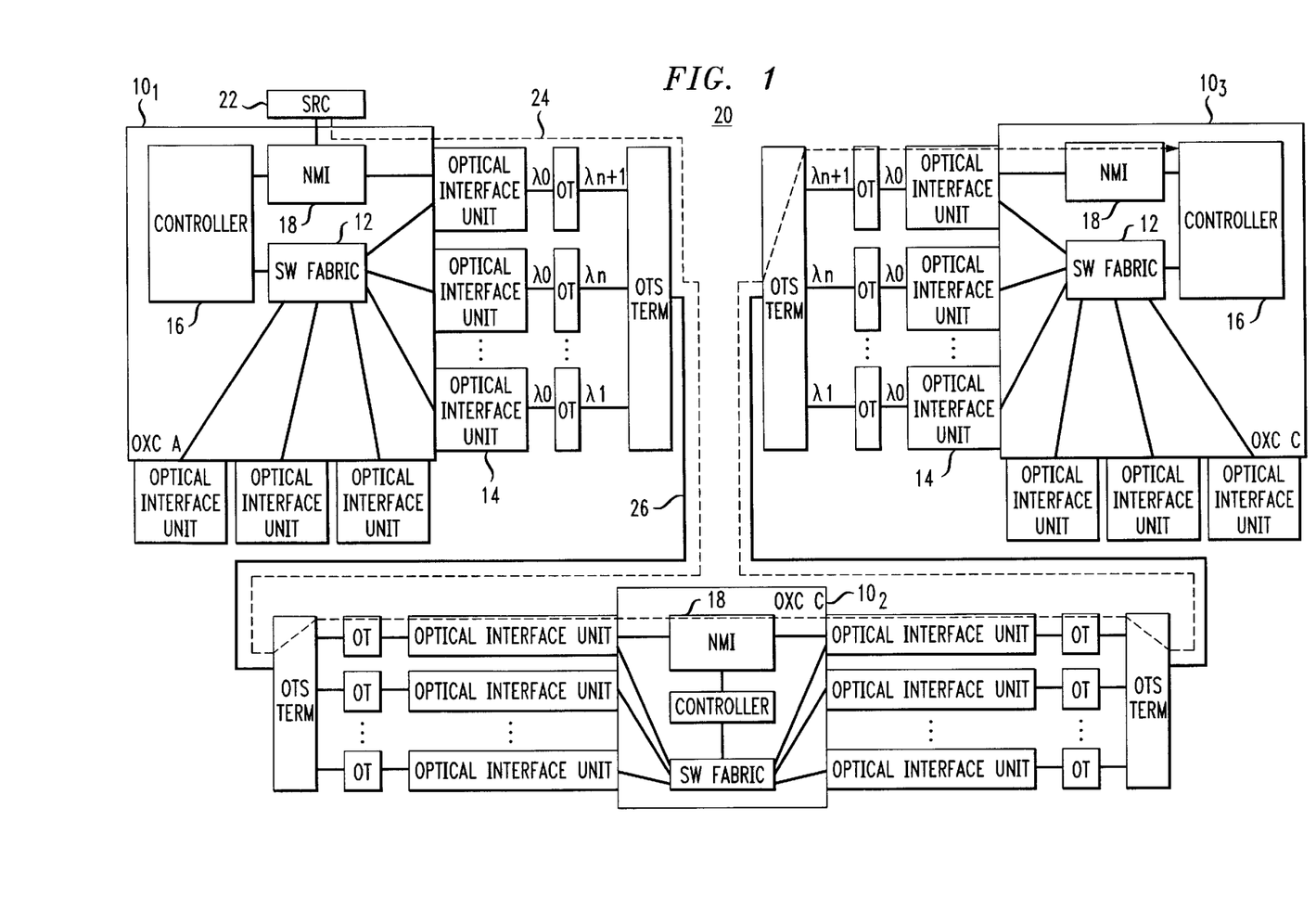
FIG. 1 illustrates an exemplary arrangement of a set of three optical cross-connect (OXC) nodes.

In order to fully understand the restoration methodology of the present invention, it is useful to first evaluate an exemplary architecture for a communication network utilizing optical cross connects. FIG. 1 illustrates a portion of one such network and shows, in particular, a set of three optical cross-connects (OXCs) $10_1$, $10_2$, and $10_3$. Each OXC includes a switch fabric 12 for providing the proper connections between the input and output optical interface units 14, a controller 16 for setting the desired connections within switch fabric 16, and a network management interface (NMI) 18. In addition to performing conventional network management activities (such as provisioning), network management interface 18 is used in accordance with the present invention for routing restoration messages. For the purposes of the present discussion, it will be presumed that all three OXCs are located within a single subnetwork 20. Subnetwork partitioning (either "minimally overlapping" or "highly overlapping") will be discussed in detail below in associated with FIGS. 2 and 3. For the arrangement illustrated in FIG. 1, a subnetwork restoration controller (SRC) 22 is coupled to one of the OXCs (in this case, OXC $10_1$). SRC 22 contains all interconnect information for its own subnetwork 20, as well as interconnect information related to the complete set of subnetworks (not shown). When a communication failure is recognized, this information is passed to SRC 22 as a "fault notification message", where SRC 22 then sets up a restoration signal path.

In order to provide restoration in an expedited manner, the architecture of the present invention preferably includes an "in-span" data communication path. An "in-span" arrangement can generally be defined as a system that uses the conventional signal transmission links to transmit the "network" data and usually occurs over an embedded operations channel. Some examples are: (1) a dedicated (n+1) wavelength, over which a conventional signal, such as OC-n, is used as the basis of communication, (2) extra bits of the digital signal of a designated channel of the link (e.g., broadcast by transponders that are integrated with each OXC) or (3) low modulation depth AM signal modulated on top of intensity modulated digital signal. A general "necessary condition" of in-span restoration methods is that if it is possible to restore paths on restoration routes, then it is possible for the involved OXCs to communicate.

For the purposes of the present discussion, it will be presumed that a dedicated operations channel from SRC 22 through NMI 18 of each OXC 10 will be used as the in-span data channel. Such a dedicated channel 24 is illustrated as a dotted line in FIG. 1. In this arrangement, therefore, fault analysis isolation of optic line failures vs. individual wavelength failures (for example, failure of the OC-48 signal or associated optical translator) is possible. That is, if fiber 26 between OXC $10_1$ and OXC $10_2$ is cut, then all wavelengths $\lambda_1$ through $\lambda_{n+1}$ are lost and it can be correctly concluded that a "line failure" has occurred. In contrast, if one of the optical translators ($\lambda_i$, i<n+1) at OXC $10_1$ fails, then as long as operations channel 24 at wavelength $\lambda_{n+1}$ is still operative, it can be concluded that an individual wavelength (channel) failure has occurred.

In accordance with the restoration needs of the present invention, NMI 18 is preferably a specialized, high-speed network management interface that is designed to work quickly, possibly by avoiding the conventional network management elements used for connection and fault management. The expedited interface may bypass the conventional interface, since the communications associated with a conventional interface use a relatively slow network management language that is required to communicate with an operations system. The contents of the restoration messages and the operation of the OXCs and SRC in response to these messages will be discussed in detail below in association with FIGS. 2 and 3.

Figure 2:
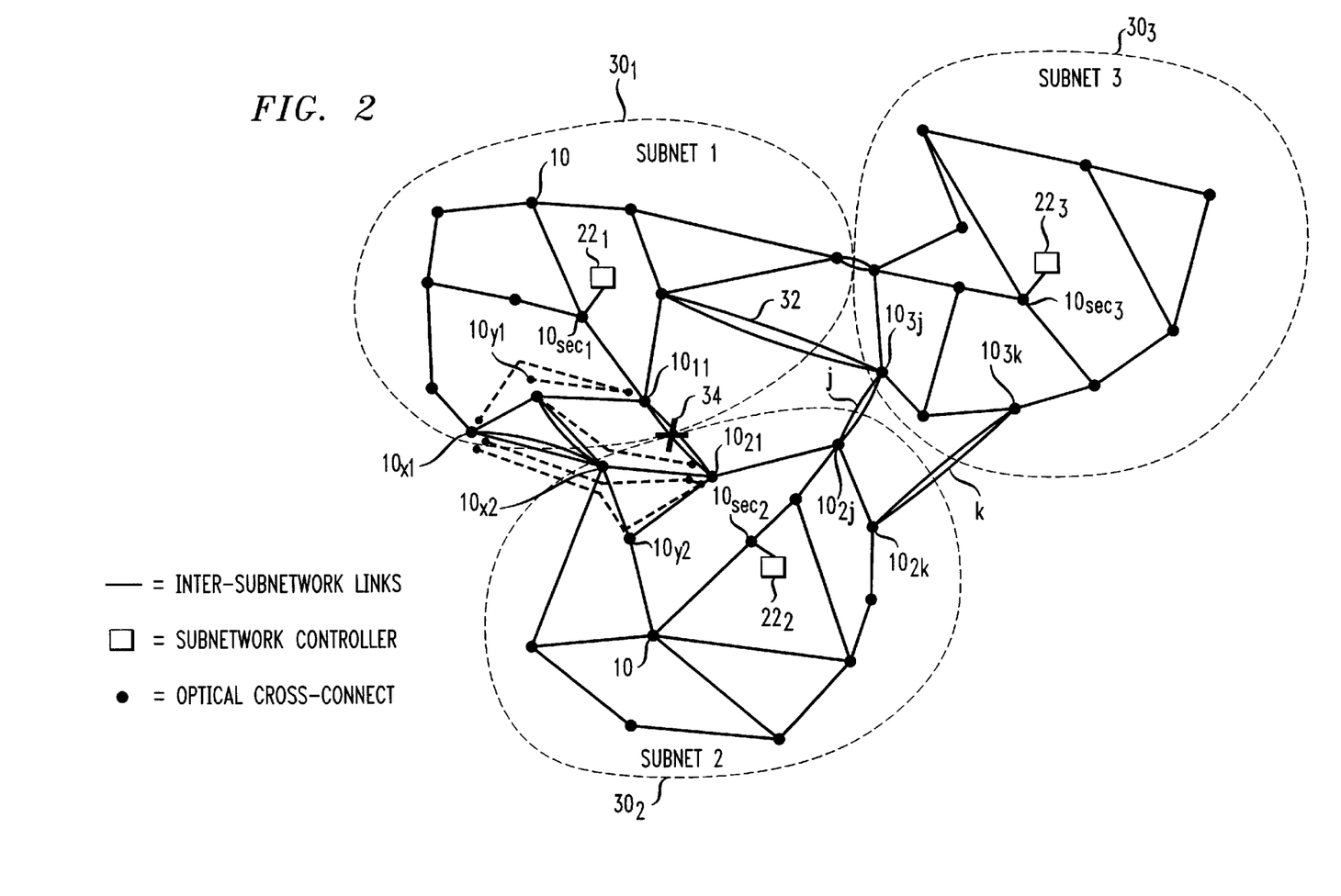
FIG. 2 illustrates an exemplary "minimally overlapping" subnetwork partitioning useful in providing restoration in accordance with the present invention.

FIG. 2 illustrates an exemplary partitioning of a communications network into a plurality of subnetworks $30_1$, $30_2$ and $30_3$. In accordance with the present invention, the partitioning as shown in FIG. 2 is defined as a "minimally overlapping" network architecture, that is, there are a minimal number of links shared between the subnetworks. Each subnetwork $30_i$ includes a plurality of OXCs 10 and a single subnetwork restoration controller (SRC) $22_i$, where SRC $22_i$ is associated with (and preferably co-located with) one OXC, designated as the SRC interface for that particular subnetwork and depicted in FIG. 2 as $10_{SRCi}$. For the "minimally overlapping" partitioning to be appropriate, the network topology must be clustered, wherein each cluster is well-connected or "survivable" ("survivable" meaning that there exist two or more node or link disjoint paths between each pair of nodes defined by the endpoints of a link), and each cluster can be connected to the others at separable links. In other words, each subnetwork $30_i$ can be isolated from the others by the deletion of a set of edges, yet each subnetwork retains the same well-connected characteristics within itself. For the purposes of the present invention, a "boundary link", such as link 32 of FIG. 2, is defined as having a first end node (OXC) in one subnetwork and the other end node (OXC) in another subnetwork. A "boundary node" is defined as node not in the current subnetwork, but for which the SRC 22 of that network needs to communicate to restore failures on its boundary link. Referring to FIG. 2, OXC $10^{3j}$ of subnetwork $30_3$ is a "boundary node" for SRC $22_1$ of subnetwork $30_1$, since if boundary link 32 fails, SRC $22_1$ needs to restore the failure through OXC $10_{3j}$. At a minimum, the end nodes on each boundary link are "boundary nodes" and each SRC $22_i$ is configured to communicate with all "boundary nodes" in its subnetwork. For example, nodes $10_{3j}$ and $10^{3k}$ in subnetwork $30_3$ form boundary nodes for subnetwork $30_2$ to connect it to subnetwork $30_3$, while nodes $10_{2j}$ and $10_{2k}$ are boundary nodes for subnetwork $30_3$. Links $32_j$ and $32_k$ are thus defined as "boundary links".

Links between each OXC 10 make use of the dedicated operations channel 24 described above to broadcast "faults" and communicate queries between the SRCs and OXCs. Therefore, the quasi-centralized restoration arrangement of the present invention emulates a distributed method by using high-speed "in-span" distributed communications, yet emulates a centralized method by maintaining network graphs and rerouting algorithms, as well as cross-connect control, within a subnetwork restoration element (SRC) 22. In particular, the network graph includes information such as the nodes (OXCs) and links, plus channel (wavelength) information (e.g., "working", "spare", "protection", "operations", etc.), and connection-to-channel assignments of all the nodes in its subnetwork, all of its boundary nodes, and all links among these nodes. Each SRC 22 maintains this data by sending out queries to each node in its subnetwork, plus its boundary nodes, on a very frequent basis. These queries are essentially "off-line" to the restoration process itself. When a failure occurs, the current network graph data within the SRC is used to drive the restoration decision process. Each SRC 22 then determines its own subnetwork connections, that is, connections that originate/terminate within that subnetwork, or the portion of connections between a subnetwork node and a boundary node, and channel (wavelength) assignments by piecing together the cross-connect information maps from the cross-connect query. The restoration process in accordance with the present invention will be discussed in detail below in association with FIG. 4.

Figure 3:
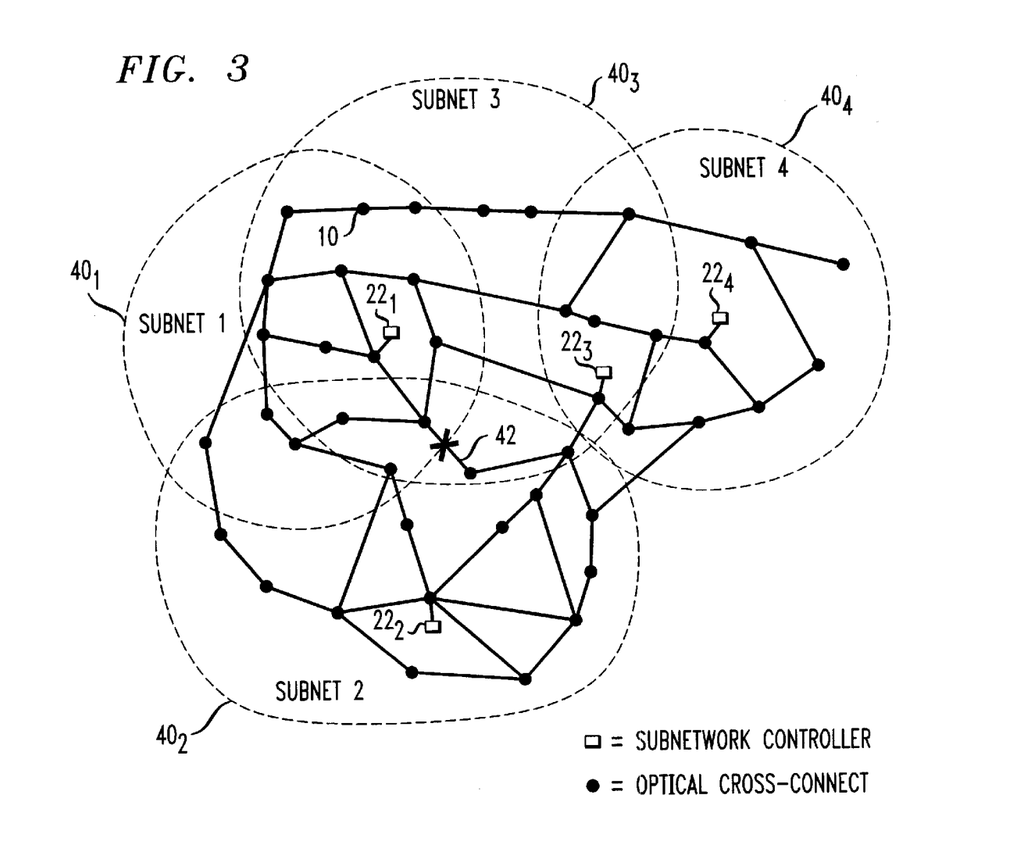
FIG. 3 illustrates an exemplary "highly overlapping" subnetwork partitioning useful in providing restoration in accordance with the present invention.

If the network is such that it is difficult to ascertain and define "clusters" of nodes and delineate subnetworks in the manner as shown in FIG. 2, then a "highly overlapping" subnetwork partitioning may be used, as shown in FIG. 3. As is obvious from its definition, "highly overlapping" subnetworks $40_1$, $40_2$, $40_3$ and $40_4$ are chosen to experience significant overlap, eliminating the need to define "boundary nodes". In the case of a "highly overlapping" subnetwork architecture, each SRC 22 restores outages strictly within its own subnetwork. Since a large number of nodes (OXCs) may be included in multiple subnetworks, inclusion of diverse paths for each link within at least one subnetwork, and identification of the controlling SRC are key to this method. As with the "minimally overlapping" subnetwork partitioning discussed above, a dedicated operations channel is used in the arrangement of FIG. 3 to provide for restoration message transmission.

An exemplary process for defining subnetworks in the "highly overlapping" arrangement includes the following steps (where it is to be understood that there may be various other processes used to form such partitioning): (1) delete 1-connected nodes and links from the network (for purposes of analysis), where link connectivity in general may be calculated using a conventional "max-flow" algorithm. To define the network graph of the max-flow algorithm, for each link $\{ii,j\}$ in the network that corresponds to an inter-OXC link, define a pair of directed edges, (ii,j), (j,j). For each link in the network, "fail" this link by setting the capacity on all other edges to "1". Then, for each link $\{k,m\}$ in the network, set the capacity on all edges into the source and out of the sink to "0", where (source, sink)=(k,m) (or=(m,k)). The maximal flow will then equal the connectivity for edge $\{k,m\}$. This "max-flow" step can then be repeated for all edges; (2) an SRC 22 is defined in each large location within the network and, as before, associated with one OXC, defined as $10_{SRCi}$; (3) find the shortest-hop route between each SRC 22 and all the nodes in the network; (4) define each subnetwork as including only one SRC and all nodes within a predetermined radius R; (5) delete 1-connected nodes and links in the subnetwork, where a link is contained in a subnetwork if and only if both its nodes are within the same subnetwork; (6) delete the 1-connected nodes and links from each subnetwork; (7) determine if there are links and nodes in the restorable network that are not covered by at least one subnetwork. For such a node, expand the subnetwork radius R for the closest SRC 22 and recompute steps 3–6 for that subnetwork; and (8) ascertain any remaining links not contained within a single subnetwork. Include any such links with a minimum number of nodes required to maintain connectivity such that the additional number of nodes is minimal. Following these steps results in the formation of a "highly overlapping" subnetwork partitioning, such as that illustrated in FIG. 3.

With the establishment of the proper subnetwork partitioning (either "minimally overlapping" or "highly overlapping") and the definition of the appropriate network graph within each SRC, the network is prepared to provide for "fault" message routing and network restoration in accordance with the present invention. In general, there are two different message routing methods that may be used, defined as "flooding" message routing and "1+1" message routing. Either routing method may be used with the "minimally overlapping" architecture, where the "1+1" message routing method is preferred for the "highly overlapping" architecture. "Flooding" is a highly robust and distributed communication method, wherein a node rebroadcasts a received query on each link connection (except for the link on which the query was received). In the "1+1" method, each SRC 22 determines two node disjoint paths to each OXC with which it needs to communicate and sends all received messages along these two paths. Regardless of the routing method, the types of messages are identical and their content is the same (except, of course, for the message routing information). Table 1 lists the fields of possible messages between an OXC 10 and SRC 22 for the "flooding" method of message routing.

TABLE 1

Message Set for "Flooding" Method of Message Routing

| MESSAGE TYPE | FROM | TO | DATA ITEMS |
| --- | --- | --- | --- |
| Query | SRC | OXC | Message ID, message type, source subnetwork ID, destination subnetwork ID, destination OXC ID, error info |
| Query response | OXC | SRC | Message ID, message type, source OXC ID, source subnetwork ID, destination subnetwork ID, cross-connect map, error info |
| Fault notification | OXC | SRC | Message ID, message type, source OXC ID, source subnetwork ID, destination subnetwork ID, fault type, failed termination points (TPs), error info |
| Cross-connect | SRC | OXC | Message ID, message type, source subnetwork ID, destination OXC ID, destination subnetwork ID, sequence of new cross-connects, error info |
| Cross-connect response | OXC | SRC | Message ID, message type, source OXC ID, source subnetwork ID, destination subnetwork ID, cross-connect map confirmations and error codes, error info |

In a similar fashion, the message set for the "1+1" method of message routing are as defined in the following table:

TABLE 2

Message Set for "1 + 1" Method of Message Routing

| MESSAGE TYPE | FROM | TO | DATA ITEMS |
|---|---|---|---|
| Query | SRC | OXC | Message ID, message type, source subnetwork ID, destination subnetwork ID, destination OXC ID, full OXC path (IDs), error info |
| Query response | OXC | SRC | Message ID, message type, source OXC ID, source subnetwork ID, destination subnetwork ID, full OXC path, cross-connect map, error info |
| Fault notification | OXC | SRC | Message ID, message type, source OXC ID, source subnetwork ID, destination subnetwork ID, full OXC path, fault type, failed termination points (TPs), error info |
| Cross-connect | SRC | OXC | Message ID, message type, source subnetwork ID, destination OXC ID, destination subnetwork ID, full OXC path, restoration efficiency (highly overlapping only), sequence of new cross-connects, error info |
| Cross-connect response | OXC | SRC | Message ID, message type, source OXC ID, source subnetwork ID, destination subnetwork ID, full OXC path, cross-connect map confirmations and error codes, error info |

The "data items" for each message set are defined in Table 3, included below:

TABLE 3

Data Message Items

| Data Item | Description |
|---|---|
| Message ID | 8 octet unique numerical identifier |
| Message Type | as defined in first column of Table 1 |
| Subnetwork and OXC IDs | 4 octet numerical fields (standardized addressing is not necessary for this application) |
| Cross-connects | Ordered pairs $\{(t_1,t_2)\}$, where $t_1$ and $t_2$ denote "termination points" (TPs) |
| Fault Type | Loss of Signal (LOS) - Line, LOS Optic Interface Port, LOS operations channel (i.e., signals OK on other interfaces), Optic Interface Port - Standard SONET Performance Threshold Crossing on constituent signal and associated fault (LOS, Loss of Pointed, Severed Error Seconds, Loss of Frame, etc.) |
| Cross-connect error codes | Standard cross-connect errors as specified by manufacturer for normal provisioning (e.g., undefined TP, TP not in service/configured, TP already assigned, system error, syntax error in command, etc.) |

As mentioned above, the "flooding" method of message routing is primarily applicable to the "minimally overlapping" subnetwork architecture. In general, a node rebroadcasts a received query on all links that intersect it (except for the originating link). As messages repeat to a node, however, they are not rebroadcast. As messages sent from a given SRC 22 are received by boundary nodes 10 that are contained in another subnetwork 20, they are also not rebroadcast. When a query is received by an OXC 10 for which it is destined, the restoration interface in its NMI 18 picks off the message, processes the request, and sends back a response to the proper SRC 22 by the same type of flooding message routing.

For messages from an OXC node 10 to an SRC 22, OXC node 10 will send out messages to its own SRC, plus one message to each SRC for which it is a boundary node. The originating node sends out a copy of each message to each OXC, via the data communication channel, to which it is connected. An NMI 18 in the OXC 10 that receives such a message uses the information in the message to decide whether to forward it to other nodes. The flooding rule is that upon receiving a message, a node forwards that message if either the source subnetwork ID or the destination subnetwork ID corresponds to its own subnetwork ID. This ensures that messages from an OXC in subnetwork $30_1$ to $SRC_2$ in subnetwork $30_2$ (for which node $10_x$ is a boundary node) will reach $SRC_2$ via surviving boundary links and, in some cases, to get to these boundary links by having to transit interior nodes in subnetwork $30_2$. To forward the message, OXC node 10 broadcasts it to all other nodes to which it is connected. For simplicity, it may be assumed that the subnetwork ID is the same as the SRC ID for that subnetwork. For messages from an SRC 22 to an OXC node 10, usually one message is sent. The same forwarding rules apply (that is, upon receiving a message, a node forwards that message if either the source subnetwork ID or the destination subnetwork ID corresponds to its own subnetwork ID).

For example, the "X" in FIG. 2 represents a fault on link 50 between nodes $10_{11}$ and $10_{21}$. Node $10_{11}$ detects the fault and sends out a first "fault notification message" to SRC $22_1$ (its own SRC, via node $10_{SRC}$) plus a second "fault notification message" to SRC $22_2$. Referring to Table 1, the first "fault message" will contain the following information: source OXC ID=$10_{11}$, source subnetwork ID=$30_1$, and destination subnetwork ID=$30_1$. The second "fault message" will contain the following information: source OXC ID=$10_{11}$, source subnetwork ID=$30_1$, and destination subnetwork ID=$30_2$. As nodes in subnetwork $30_1$, receive the first fault message, they forward it to all their neighbors, since the source and destination subnetwork IDs are the same as their own. Eventually, the message gets to OXC node $10_{SRC}$ which is directly coupled to SRC $22_1$ and SRC $22_1$ reads the received message. As copies of this first message enter subnetwork $30_2$ and $30_3$, they are discarded. The second fault message is relayed to all nodes in subnetwork $30_1$. Since the "source subnetwork ID" is the same as their own subnetwork, each node will forward the message. As the message is passed to subnetwork $30_2$, each of the nodes 10 in this subnetwork will also forward the message, since the "destination subnetwork" is the same as their own (all nodes in subnetwork $30_3$ will discard the message). In particular, OXC nodes $10_{x1}$ and $10_{y1}$ in subnetwork $30_1$ receive and forward the message to OXC node $10_{x2}$ in subnetwork $30_2$. Node $10_{x2}$ broadcasts the message to its neighbors in subnetwork $30_2$ and, therefore, the message eventually reaches SRC $22_2$.

In the "1+1" message routing method, each SRC $22_i$ determines two disjoint paths to each OXC node 10 with which it needs to communicate. These communication paths can easily be determined from the network graph, discussed above. In a preferred embodiment, a "primary" path should comprise the shortest hop route (easily ascertained from conventional labeling type algorithms). The second node-disjoint path can be chosen by setting, in the algorithm, the edge weights to infinite length for all intermediate nodes coincident on nodes of the primary path and then finding the shortest-hop path in the resultant network. If no such node-disjoint path exists, then the edge-disjoint path is found and used. Critical messages are sent between SRC 22 and OXC node 10 by broadcasting on both of these paths. Since the same message ID is used, the receiving entity knows to discard the redundant message. The messages are routed, in accordance with the information in Table 2, by including the full node path in each message. Each intermediate OXC node picks off the next node in the path and forwards the message. Instead of including and using the full node path, a path ID may be defined and stored (off-line) for each node. Then, when the message arrives, the node reads the path ID in the message and accesses the next node from its memory.

Figure 4:
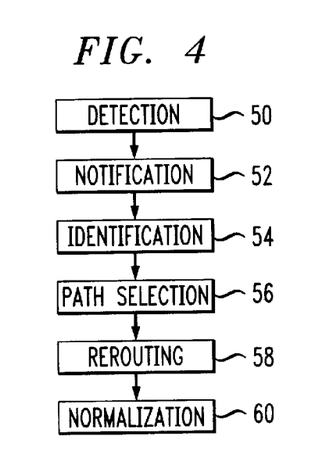
FIG. 4 contains a flow chart depicting an exemplary restoration process in accordance with the present invention.

In accordance with the present invention, "restoration" of service in the presence of a fault condition in a communications network is achieved using the method as outlined in FIG. 4. At the start of the process, defined as step 50, an OXC 10 "detects" the failure of an optic line (multiplexed wavelengths over a given optic pair), or an individual wavelength, and sends a fault message to its NMI 18. In the "notification" step 52, NMI 18 sends a "fault notification" message to its own SRC 22, as well all other SRCs for which that particular OXC 10 is a boundary node. If the "flooding" method of message routing is employed, the message forwarding rules discussed above are applied. If the "1+1" method is used (particularly suited for the "highly overlapping" architecture), then the OXC simultaneously broadcasts the message on the pair of defined disjoint paths to ensure that the message is transmitted over the surviving links.

In the subsequent "identification" step 54, the controlling SRC 22 identifies itself. If a link fails within a subnetwork boundary, then the SRC of that subnetwork controls the rerouting process. Failure of a "boundary link" is a more complex situation and will be discussed in detail below. Returning to the situation where a link fails within a subnetwork, SRC 22 first identifies the channels (wavelengths) that have failed. Given the needed inventory status, SRC 22 can employ different methods to selectively restore wavelengths and not others. For example, some wavelengths may carry links of SONET rings where, to avoid restoration contention and "cycling" between normalization and fault states, those channels are not restored. If desired, this information can be specified by an operations system when the connection is provisioned. It is preferable to store this information in the OXC with its connect-type data, then allowing the SRC to pick up this information with its OXC queries.

In the following "path selection" step 56, the new subnetwork connections that route over the failed links or nodes are generally rerouted within the subnetwork (this is always the case for the "highly overlapping" architecture, since there are no boundary nodes defined in this arrangement). The rerouting process may utilize a hybrid, pre-planned method where the reroutings for each subnetwork are predefined for each potential link or node failure. For failures not anticipated by this method, a "dynamic" routing method is used, such as a shortest hop route over available restoration spare channels. For the "rerouting" step 58, the chosen rerouting method depends upon whether the network has been partitioned using the "minimally overlapping" approach or the "highly overlapping" approach. In the "minimally overlapping" architecture, the controlling SRC 22 sends "cross-connect" messages to OXC nodes 10. If the "1+1" message routing scheme is employed, then the SRC sends the cross-connect message on both disjoint paths. OXC node 10 then sends "cross-connect" completion acknowledgments to both its own SRC and any other SRC for which it may be a boundary node. Each SRC then adjusts for confirmations that were not received, or received as "failed" (i.e., the SRC sends additional "cross-connect" messages to other OXCs until all paths have been re-established).

For the "highly overlapping" architecture, each SRC sends a first cross-connect command to the least numbered OXC on the end of the failed link(s) and waits for acknowledgment. The receiving OXC chooses the controlling SRC. In accordance with the present invention, two different methods of SRC selection may be employed. In the first method, the SRC that sent the first message received is chosen. In the second method, each SRC sends a "restoration efficiency" measure along with the cross-connect message ("restoration efficiency" can be defined as the number of connections that the SRC was able to reroute in its path selection step), and the OXC chooses the SRC with the best efficiency. Once the selection is made, the OXC immediately responds with a cross-connect confirmation to the selected SRC. Other SRCs either time-out or are sent negative confirmations by the OXC.

Lastly, once the signal on a failed channel (wavelength) is healthy again, a "clear" fault notification message is broadcast, as shown in step 60. This message is sent from the affected nodes to the SRC. The SRC then proceeds to send cross-connect messages to restore the original path of the failed connection.

As mentioned above, failures on boundary links or boundary nodes (present only in the "minimally overlapping" architecture) requires more scrutiny than non-boundary situations. In accordance with the present invention, there are two possible procedures for providing rerouting in these situations.

The first approach, referred to as the "single SRC" method, allows for only one of the SRCs to control the rerouting process. In this approach, the SRC selection scheme must be consistent so that no contention arises in multiple link failures or node failures. To achieve this consistency, all OXC nodes that detect failures are required to send the standard Far End Receive Failure (FERF) message to the opposite end of the link for which they detect loss of signal or other performance alarm for which restoration is necessary. Upon receipt of a FERF message, an OXC node will broadcast this alarm, as it does any other alarm, to its associated SRCs in the manner described above. The presence or absence of an error message, along with other received alarms, will allow an SRC to determine what type of failure has occurred. Therefore, if an SRC receives an alarm from an OXC node on failed wavelengths (channels) of a particular link, then its responsibility to control restoration depends upon two conditions. First, if the SRC also receives an alarm or FERF from the node on the other side of the failed link, then this means that the OXC on the other end of the link is "alive" and either SRC can control restoration. In this case, the lowest numbered (alphanumeric ordering) SRC should control the process. Each SRC will be able to discern whether it is the lowest numbered by comparing the source and destination subnetwork IDs that it receives in the fault notification messages from both nodes. Second, if the SRC does not receive an alarm or FERF from the node on the other side of the failed link within a predetermined interval after receiving the first link failure notification, then it assumes that the node on the other end has failed. If the failed node is controlled by that SRC (i.e., the failed node and the SRC are in the same subnetwork), then that SRC initiates and controls the restoration process. Otherwise (i.e., if the failed node and the SRC reside in different subnetworks), the SRC does nothing for this particular failure and assumes that the "home" SRC of the failed node will control the process.

An example of rerouting can be illustrated using the "minimally overlapping" network as shown in FIG. 2. In particular, presume that a failure has occurred on link 34 between OXC node $10_{11}$ in subnetwork $30_1$ and OXC node $10_{21}$ in subnetwork $30_2$. In this case, SRC $22_2$ will receive an LOS fault message from OXC node $10_{21}$ for wavelengths on link 34, and also receive a similar fault message from node $10_{11}$. Since SRC $22_2$ is not the "lowest" numbered SRC connected to these nodes (SRC $22_1$ of subnetwork $30_1$ is the lowest), then SRC $22_2$ will do nothing. Indeed, SRC $22_1$ will control restoration. In another example, if OXC node $10_{11}$ fails, neither SRC $22_1$ or SRC $22_2$ will receive a "fault" message from that node. Both SRCs will receive a "link" fault message from OXC node $10_{21}$. SRC $22_2$ will conclude that OXC node $10_{11}$ has failed and will do nothing to initiate restoration, since OXC node $10_{11}$ is not within its own subnetwork. That is, SRC $22_1$ will assume restoration control and will initiate restoration among the "boundary subnetwork" (nodes $10_{y1}$, $10_{x1}$, $10_{11}$ and $10_{21}$), as well as any other nodes in subnetwork $30_1$. The definition of a "boundary subnetwork" for subnetworks $30_1$ and $30_2$ is a set of nodes that enable restoration among the boundary nods and links of the two subnetworks. At a minimum, the boundary subnetwork comprises all the nodes that are on the boundary of the two subnetworks, plus all the links among those nodes. Therefore, this "single SRC" approach is restricted to finding restoration routes within the boundary subnetwork.

In the alternative approach, two (or more) SRCs work simultaneously—and autonomously—to provide restoration around a failed boundary node or link. For each link in the network, a first SRC is pre-defined as the "primary" SRC and a second SRC is defined as the "secondary" SRC. The primary SRC attempts to route as many of the failed connections on the failed link to alternate paths from the node in its subnetwork to the other boundary nodes in the neighboring subnetwork that are not in its subnetwork. Referring to FIG. 2, the alternate paths associated with the failure of boundary link 34 are illustrated by short dotted lines, where SRC $22_2$ is defined as the "primary" SRC and SRC $22_1$ is defined as the "secondary" SRC. Secondary SRC $22_1$ tries to route as many of the failed connections on the failed link to the boundary nodes of the neighboring subnetwork, as illustrated by the long-dashed paths in FIG. 2.

For a local rerouting method, it is immaterial which path is chosen for which failed connection, as long as the channel (wavelength) assignments for the alternate route match on both nodes coincident on the failed link. Therefore, simple ordering rules can be employed to match the paths chosen by each SRC independently. For example, the primary SRC can order its alternate paths based on the ordering of the channel (wavelength) numbers of the boundary links of the paths, with multiple boundary links being ordered by the order of the boundary node (nodes can be ordered, for example, by lexicographic ordering on their IDs). Since it also inventories the boundary links, the secondary SRC can then mimic the same ordering scheme to map the channels (wavelengths) of the failed link to the channels (wavelengths) of the boundary links.

For example, presume that boundary link 34 in FIG. 2 has four working connections that are assigned to channels (wavelengths) #1–4 of link 34. Also, assume that there are two channels reserved for restoration on the link between OXC nodes $10_{y1}$ and $10_{x2}$ (channel #'s 4 and 7), and two channels reserved for restoration on the link between OXC nodes $10_{x1}$ and $10_{x2}$ (channel #'s 1 and 2). When link 34 is cut, primary SRC $22_2$ seeks and finds four alternate paths that route over the above restoration channels on the bound links, in order: (1) nodes $10_{21} \rightarrow 10_{x2} \rightarrow 10_{y1}$, (restoration channel #4 of the link between OXC nodes $10_{y1}$ and $10_{x2}$; (2) nodes $10_{21} \rightarrow 10_{x2} \rightarrow 10_{y1}$ (restoration channel #7 of the link between OXC nodes $10_{y1}$ and $10_{x2}$; (3) nodes $10_{21} \rightarrow 10_{x2} \rightarrow 10_{x1}$ (restoration channel #1 of the link between OXC nodes $10_{x1}$ and $10_{x2}$; and (4) nodes $10_{21} \rightarrow 10_{y2} \rightarrow 10_{x2} \rightarrow 10_{x1}$ (restoration channel #2 of the link between OXC nodes $10_{x1}$ and $10_{x2}$). SRC $22_2$ sends the cross-connect commands to the nodes in each of the above routes to create the four alternate paths (for example, a cross-connect command to such as channel 1 of link 34 is cross-connected to a restoration channel of the first restoration link at node $10_{21}$).

In parallel, SRC $22_1$ (the "secondary" SRC), seeks and finds two paths between OXC node $10_{11}$ and node $10_{y1}$ so as to connect the two restoration channels on the link between OXC nodes $10_{x2}$ and $10_{x1}$, as well as two paths between OXC node $10_{11}$ and node $10_{x1}$ to connect the two restoration channels on the link between OXC nodes $10_{x1}$ and $10_{x2}$. Second SRC $22_1$ then sends the appropriate cross-connect cornrnands to the nodes of the paths needed to create these four restoration routes. When the rerouting step is finished, and after a time-out period (for the cross-connects for which the SRC did not receive "cross-connect completed" messages from the particular OXCs), the SRC will re-adjust its routings accordingly, depending on the type of cross-connect completion failure. For example, if the completion message was never received, the SRC may send out queries to the involved nodes to verify the cross-connections. Alternatively, if a cross-connection confirmation was received, but specifies that the cross-connect failed (e.g., invalid port, channel already cross-connected, etc.), the other corrective action (if any) may be taken.

As the primary and second SRCs work in parallel, their partial paths will be joined properly at the channels on the boundary links that are reserved for restoration. However, a problem may occur if either SRC is unable to find restoration paths for all of the reserved restoration channels on the boundary links. Then, the two SRCs, working independently, will mismatch the cross-connects. Under these circumstances, the two SRCs can be coordinated by setting "markers" on the failed paths. For example, presume that SRC $22_1$ can find only one spare restoration path for connecting OXC node $10_{11}$ to OXC node $10_{y1}$. SRC $22_1$ will then complete its rerouting of the first channel on link 34 (the failed link), stop the rerouting process, and then "unset" (i.e., "disconnect") the cross-connect of the next failed channel (channel #2 at the link between nodes $10_{y1}$ and $10_{x2}$, at node $10_{11}$). Since this channel is still cross-connected on its original working path, it can serve as a marker to SRC $22_2$ from subnetwork $30_2$, indicating that SRC $22_1$ stopped in the rerouting process on this channel.

OXC node $10_{11}$ then sends a confirmation message of the "disconnect" request to SRC $22_2$, as well as SRC $22_1$. When SRC $22_2$ receives the "disconnect confirmation", it will stop the rerouting process. If it had proceeded beyond the channel for which the disconnect message was received, then the SRC would have "undone" all of the cross-connects that occurred after the path that connected channel #4 of that link. If SRC $22_2$ had not yet processed its rerouting algorithm to that point, it then completes the process to that channel and stops. After reaching the stop point, both SRCs $22_1$ and $22_2$ skip to the next ordered boundary link (i.e., the link between OXC nodes $10_{x1}$ and $10_{x2}$). It is noted that if SRC $22_1$ can find no paths from OXC node $10_{11}$ to OXC node $10_{x1}$ (to connect the restoration channels on the boundary link between nodes $10_{x1}$ and $10_{x2}$), it then disconnects channel #2 on the link between nodes $10_{11}$ and $10_{21}$ at node $10_{11}$. This disconnect ensures that the interrupt message is received by SRC $22_2$, so that it will skip this boundary link as well.

Each SRC repeats this process until either it has rerouted all of the failed channels, or it runs out of restoration channels on the boundary links, or the completion time-out interval has expired. Summarizing, each SRC backs off the rerouting process to the minimum-ordered channel for which either it could not find a restoration path, or for which it received a disconnect message interrupt from the node on the opposite side of the of the failed boundary link.

What is claimed is:

1. A method for providing optical path restoration in a communications network, the method comprising the steps of:
   a) partitioning the communications network into a plurality of subnetworks, each subnetwork comprising a plurality of optical cross-connect (OXC) nodes;
   b) providing a subnetwork restoration controller (SRC) in each subnetwork, each SRC including a network graph defining the interconnections of all OXC nodes within its subnetwork and a predetermined rerouting algorithm therebetween, each SRC physically coupled to only one OXC within its subnetwork;
   c) routing a "fault notification" message from a failed OXC node or a failed link between a pair of OXC nodes to a predetermined SRC; and
   d) developing a rerouting path within the predetermined SRC of step c) to circumvent the fault defined in step c); and
   e) transmitting the rerouting path of step d) to all necessary OXCs to provide restoration of communications within the network.

2. The method as defined in claim 1 wherein in performing step c), the fault notification message is routed on a dedicated operations channel separate from the data channels.

3. The method as defined in claim 1 wherein in performing step a), the communications network is partitioned into a plurality of minimally overlapping subnetworks including links between the subnetworks, defined as boundary links, with OXC nodes at both ends of boundary links defined as boundary nodes.

4. The method as defined in claim 3 wherein in performing steps c) and e) a "flooding" message routing process is used to send messages between the OXC nodes and the SRCs where each contacted OXC node forwards messages it receives if either the source of the message or the destination of the message is within its own subnetwork.

5. The method as defined in claim 4 wherein in performing step c), an OXC node recognizing a "failure" sends a "fault notification" message containing an identification of itself, an identification of a source subnetwork of the failure, an identification of a destination subnetwork, and data identifying the type of recognized failure.

6. The method as defined in claim 5 wherein in performing step c), the data identifying the type of recognized failure includes recognition of failures including: (1) "loss of signal"—line; (2) "loss of signal"—optical interface unit; (3) "loss of signal"—operations channel; and (4) far end receive failure (FERF).

7. The method as defined in claim 4 wherein in performing step c), when a failure at a boundary between subnetworks is recognized, the following steps are performed to choose a controlling SRC:
   1) transmitting a far end receive failure (FERF) message from all OXC nodes recognizing the failure to their associated nodes at the opposite end of the failed boundary in the other subnetwork associated with the failed boundary;
   2) routing a second failure message from the recognizing OXC nodes using the "flooding" message routing method;
   3) developing a rerouting message in only a lowest-ordered SRC that receives both the FERF message and the second failure message.

8. The method as defined in claim 4 wherein in performing step c), when a failure at a boundary between subnetworks is recognized, the following steps are performed:
   1) defining a primary SRC and a secondary SRC associated with the boundary failure;
   2) developing a rerouting message in the primary SRC to restore communication around said boundary failure;
   3) developing a rerouting message in the secondary SRC to restore communication around said boundary failure;
   4) joining the rerouting messages developed in steps 2) and 3) at an OXC node common to both messages, defining the joined messages as the final rerouting path for the communications system.

9. The method as defined in claim 3 wherein in performing steps c) and e) a "1+1" message routing process is used to send messages between the OXC nodes and the SRCs where each OXC node includes a primary message path to its associated SRC and a secondary message path to its associated SRC, the primary and secondary message paths being defined as disjoint paths.

10. The method as defined in claim 9 wherein the primary message path is defined as the "shortest hop path" between an OXC and its associated SRC.

11. The method as defined in claim 1 wherein in performing step a) the communications network is partitioned into a plurality of highly overlapping subnetworks where a significant number of OXC nodes are contained in more than one subnetwork such that no boundary nodes or links are required.

12. The method as defined in claim 11 wherein in performing step c), the predetermined SRC is defined as the first SRC that sends a cross-connect message to the least-numbered OXC on the failed end of the link.

13. The method as defined in claim 11 wherein in performing step c), each SRC exhibits a defined restoration efficiency and the predetermined SRC is chosen based upon the best restoration efficiency.

14. The method as defined in claim 13 wherein restoration efficiency is defined by the number of number of connections the SRC is able to reroute in a path selection step.

15. The method as defined in claim 11 wherein in performing steps c) and e) a "1+1" message routing process is used to send messages between the OXC nodes and the SRCs where each OXC node includes a primary message path to its associated SRC and a secondary message path to its associated SRC, the primary and secondary message paths being defined as disjoint paths.

16. The method as defined in claim 11 wherein the primary message path is defined as the "shortest hop path" between an OXC and its associated SRC.

* * * * *